US012605886B2

(12) United States Patent
Costabeber

(10) Patent No.: US 12,605,886 B2
(45) Date of Patent: Apr. 21, 2026

(54) STEREOLITHOGRAPHY METHOD AND MACHINE FOR THE PRODUCTION OF A THREE-DIMENSIONAL OBJECT

(71) Applicant: Ettore Maurizio Costabeber, Zane' (IT)

(72) Inventor: Ettore Maurizio Costabeber, Zane' (IT)

(73) Assignee: Ettore Maurizio Costabeber, Zane' (IT)

( * ) Notice: Subject to any disclaimer, the term of this patent is extended or adjusted under 35 U.S.C. 154(b) by 728 days.

(21) Appl. No.: 17/251,460

(22) PCT Filed: Jun. 20, 2018

(86) PCT No.: PCT/IB2018/054548
§ 371 (c)(1),
(2) Date: Dec. 11, 2020

(87) PCT Pub. No.: WO2019/243873
PCT Pub. Date: Dec. 26, 2019

(65) Prior Publication Data
US 2021/0252779 A1     Aug. 19, 2021

(51) Int. Cl.
*B29C 64/135*          (2017.01)
*B29C 64/209*          (2017.01)
(Continued)

(52) U.S. Cl.
CPC .......... *B29C 64/135* (2017.08); *B29C 64/209* (2017.08); *B33Y 10/00* (2014.12); *B33Y 30/00* (2014.12)

(58) Field of Classification Search
CPC ...... B29C 64/00; B29C 64/223; B29C 64/135
See application file for complete search history.

(56) References Cited

U.S. PATENT DOCUMENTS

| 5,650,260 A | 7/1997 | Onishi | |
| 11,590,691 B2 * | 2/2023 | Thompson | ............. B33Y 10/00 |

(Continued)

FOREIGN PATENT DOCUMENTS

| CN | 1739946 A | 3/2006 |
| CN | 103726049 A | 4/2014 |

(Continued)

OTHER PUBLICATIONS

Chinese Office Action dated Mar. 28, 2023, mailed in realted CN Appln No. 201880094844.3.

*Primary Examiner* — Galen H Hauth
(74) *Attorney, Agent, or Firm* — Volpe Koenig

(57) ABSTRACT
A stereolithography method is provided for the production of a three-dimensional object through the superimposition of layers. The method includes: application of a base substance to a supporting surface belonging to a first laminar element and to a second laminar element; selective irradiation of a layer with a predefined thickness of the base substance in contact with the supporting surface in such a way as to obtain a solidified layer; separation of the solidified layer from the supporting surface through a movement intended to move them away from each other. The application of the base substance is carried out by depositing a single layer with thickness at least corresponding to the predefined thickness so that it comes into contact with the second laminar element at least in the areas corresponding to the volume of the three-dimensional object to be obtained.

13 Claims, 4 Drawing Sheets

(51) Int. Cl.
   *B33Y 10/00*          (2015.01)
   *B33Y 30/00*          (2015.01)

(56)                      References Cited

U.S. PATENT DOCUMENTS

| 2014/0265032 | A1   | 9/2014  | Teicher et al.                    |
|--------------|------|---------|-----------------------------------|
| 2015/0183168 | A1*  | 7/2015  | Liverman ............. B29C 64/135 |
|              |      |         |                           425/166 |
| 2018/0065321 | A1*  | 3/2018  | Lu .......................... B33Y 50/02 |
| 2019/0315062 | A1*  | 10/2019 | Achten ................ B29C 64/153 |
| 2021/0362431 | A1*  | 11/2021 | Bruning ............... B29C 64/393 |

FOREIGN PATENT DOCUMENTS

| CN | 105729812  | A  | 7/2016  |
|----|------------|----|---------|
| CN | 206999634  | U  | 2/2018  |
| EP | 2665594    | B1 | 12/2014 |
| WO | 2018122712 | A1 | 7/2018  |

* cited by examiner

STEREOLITHOGRAPHY METHOD AND MACHINE FOR THE PRODUCTION OF A THREE-DIMENSIONAL OBJECT

The present invention concerns a stereolithography method for the production of a three-dimensional object through the superimposition of a plurality of layers on one another, as well as a stereolithography machine employing said method.

It is known that the stereolithography technique makes it possible to produce a three-dimensional object starting from the virtual subdivision of the volume of said object into layers having a predefined thickness, which are then made in sequence by a stereolithography machine that superimposes them on one another in order to obtain the object.

According to a known embodiment of this technique, a light hardening liquid substance, usually a polymeric resin, is placed inside a containment tank having a transparent bottom.

Successively, a supporting plate is immersed in the light hardening liquid substance until placing it at a distance from the bottom of the tank which is equal to the thickness of the first layer of the object to be made. Successively, the layer of liquid substance interposed between the supporting plate and the bottom of the tank is selectively irradiated with a controlled quantity of light energy, in such a way as to solidify it in the points corresponding to the volume of the object to be obtained.

The supporting plate is then moved away from the bottom of the containment tank, in such a way as to separate the solidified layer from the bottom itself and make it possible to obtain the layer of liquid which is necessary for making a successive layer of the three-dimensional object, an operation which is analogous to that carried out previously.

This process is repeated until all the layers making up the object have been completed.

The known stereolithography method described above poses several drawbacks.

A first drawback is represented by the excessive consumption of the light hardening material which is necessary for making an object.

In fact, according to the stereolithography method described above, the containment tank must be filled with a quantity of light hardening material sufficient to allow the supporting plate to be immersed therein, in such a manner as to define the layer of liquid substance required for each layer of the three-dimensional object. The quantity of material used will thus be inevitably larger than the quantity of material actually necessary to make the three-dimensional object.

Furthermore, due to evident reasons, the size of the tank must be larger than the size of the supporting plate. Therefore, the size of the layer of liquid substance is larger than the size strictly necessary to make each layer of the object, and this results in a further increase of the quantity of material needed. Furthermore, the excess light hardening material which remains inside the tank once the object has been completed cannot be re-used for successive processing cycles and therefore it must necessarily be disposed of owing to the presence of contaminating dust and impurities due to the operating environment and, above all, to exposure to light.

Said waste of light hardening material leads to an increase in the production cost of the object.

A further drawback posed by the stereolithography methods described above lies in that it is impossible to make a three-dimensional object comprising layers of different materials.

In fact, it is not possible to place different light hardening materials in the containment tank, as these materials would mix together. It is known that in order to overcome this drawback several containment tanks containing different materials are used, which are changed during the production of the object.

To disadvantage, this solution makes it necessary to use a number of tanks equal to the number of the materials needed to make the object, leading to longer production times of the object and increasing the structural complexity of the machine.

Another drawback posed by the method described above is represented by the fact that it is necessary to wait until the light hardening material has spontaneously and uniformly covered the bottom of the tank after the removal of the supporting plate, which increases the time required to make the three-dimensional object.

A further drawback posed by the method described above lies in that the separation of the solidified layer from the bottom of the tank during the removal of the supporting plate gives origin to a certain degree of resistance, mainly caused by the hydrostatic forces due to the fact that the supporting plate is immersed in the liquid substance. This resistance exerts a traction force on the three-dimensional object being formed, causing it to break or to deform, and also transmits a fatigue stress to the bottom of the tank, which causes it to break over time. It is known that in order to overcome this drawback the speed at which the supporting plate is moved away from the bottom of the tank is limited, in such a way as to reduce said stress.

According to a further known system adopted to overcome said drawback, the movement of the supporting plate away from the bottom of the tank is subdivided into a plurality of intermittent movements, as described in the European patent EP2665594 filed in the name of the applicant of the present invention.

However, with both of these solutions the time necessary to make each layer, and therefore the entire object, increases considerably.

According to a further solution adopted in the known art, to limit the resistance to separation described above, the movement of the supporting plate away from the bottom of the tank is controlled by determining the traction forces involved, using suitable sensors or through a numerical calculation procedure. In both of these cases, it is necessary to use specific sensors or processing software, which affect the production cost of the object.

According to another known system used to overcome the above mentioned drawbacks and described in the U.S. patent document no. US 2014/0265032, a layer of light hardening material is selectively deposited on the areas substantially corresponding to the layers of the object to be obtained. However, according to this system the selective deposit and the irradiation take place on a single movable plate which is alternatively arranged so that it faces the printing heads in the case of the depositing operation or the energy source in the case of the irradiation step. To disadvantage, with this system the production time of the three-dimensional object becomes very long, due to the waiting times necessary for moving the plate.

A further drawback posed by the known techniques described above is related to the fact that, in order to make it easier to detach the solidified layer, the bottom of the tank is covered with silicone or an equivalent material.

In fact, this material is subject to progressive opacification due to its exposure to light, which makes it necessary to frequently replace the tank.

Obviously, the repeated replacement of the tank involves an additional cost which is reflected on the cost of the object and, furthermore, longer processing times for the production of the object itself.

According to a different known technique, a printing head is used to deposit on a supporting surface a layer of light hardening material corresponding to the bitmap image of a layer of the object to be obtained, which is successively irradiated in a non-selective manner in order to solidify it.

The technique just described above makes it possible to limit the waste of material compared to the technique previously described.

However, to disadvantage, the resolution of the printing head is limited and consequently the object produced using this technique is characterized by a correspondingly limited geometrical precision.

The present invention intends to overcome all of the above mentioned drawbacks which are found in the known techniques.

In particular, it is a first object of the invention to provide a method for producing a three-dimensional object through the superimposition of a plurality of layers on one another, wherein said method should allow the quantity of light hardening material used for the production of the three-dimensional object to be reduced while at the same time making it possible to obtain a three-dimensional object characterized by a high level of resolution and accuracy. It is another object of the invention to reduce the traction forces between the solidified layer and the bottom of the containment tank while they are being separated and moved away from each other.

It is another object of the invention to avoid the need to replace the containment tank due to the opacification of the bottom of the tank itself. It is another object of the present invention to produce a three-dimensional object comprising layers of different materials without affecting the structural complexity of the machine.

It is a further object of the present invention to reduce the production times and costs of a three-dimensional object.

The objects described above are achieved by a stereolithography method according to the main claim.

Said objects are also achieved by a stereolithography machine made according to claim 12.

Further details and characteristics of the invention are specified in the respective dependent claims.

Advantageously, reducing the quantity of light hardening material used means reducing wastes and, consequently, reducing the costs deriving from the treatment and disposal of the material, and furthermore means reducing the costs related to the production of the object itself, without however affecting the precision of the object obtained.

Still advantageously, reducing the resistance to separation and the traction forces between the solidified layer and the bottom of the containment tank makes it possible to reduce the stress exerted on the tank, thus increasing the duration of the latter and reducing the frequency with which it must be replaced owing to breakages.

Furthermore, advantageously, said reduced resistance allows breakages of the object being formed to be limited compared to the known methods, though considering objects with the same geometrical shape.

Still advantageously, eliminating the need to replace the tank due to the opacification of its bottom means reducing the production time and cost of the object.

To further advantage, the possibility to use different light hardening materials makes it possible to produce three-dimensional objects formed by superimposed layers having different chemical-physical characteristics according to the different needs.

The objects and advantages described above, together with others which will be highlighted below, are illustrated in the description of some preferred embodiments of the invention, which is provided by way of non-limiting example making reference to the attached drawings, wherein.

Figures 1A, 1B:
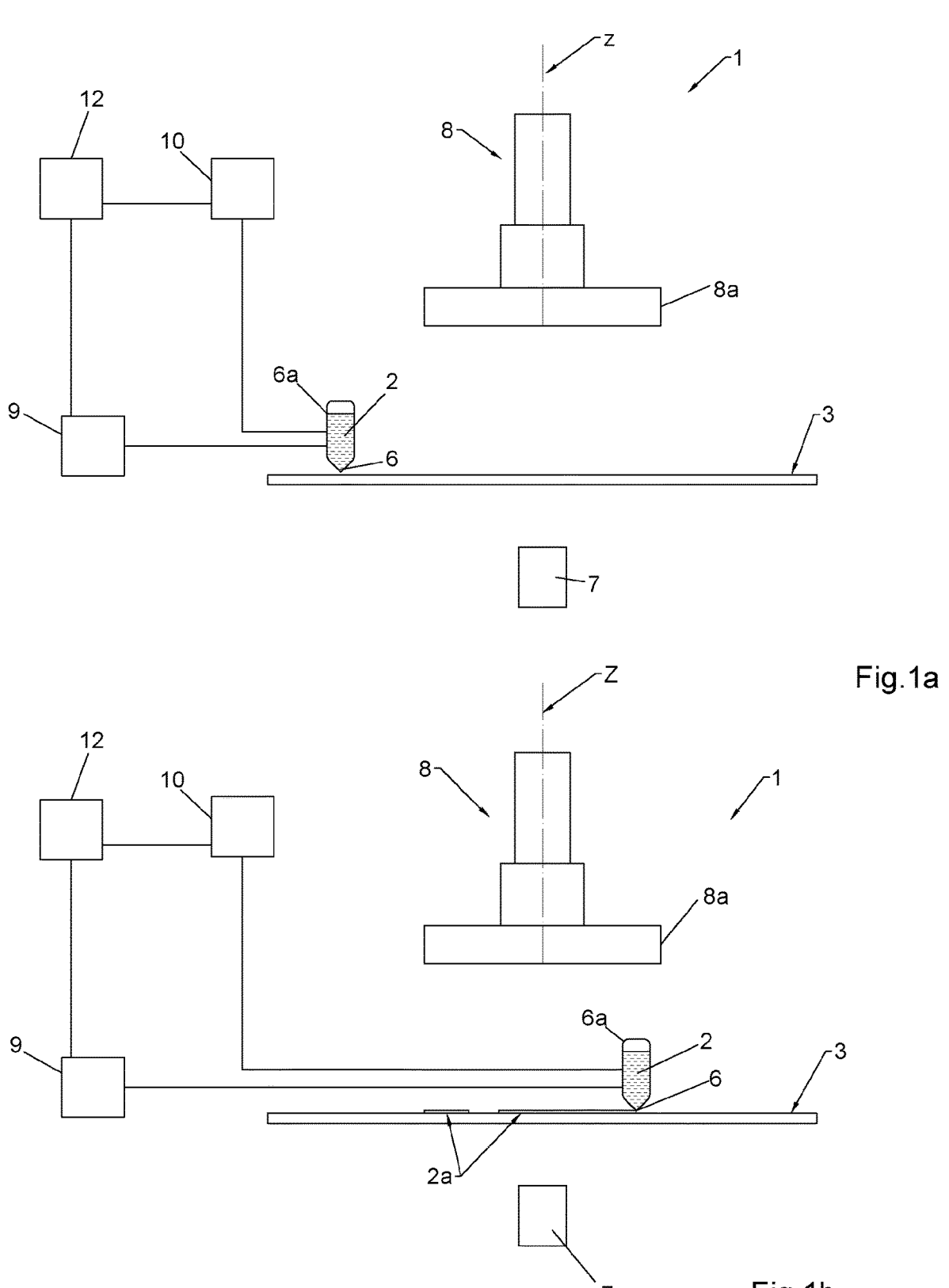
FIGS. 1a, 1b, 1c and 1d show a stereolithography machine according to the invention, in different operating configurations, during the implementation of the method which is the subject of the invention.

The stereolithography method of the invention is described with reference to a stereolithography machine which is indicated as a whole by 1 in FIG. 1a.

The stereolithography machine 1 comprises a supporting surface 3 suited to support a base substance 2, liquid or pasty, suited to be solidified through exposure to predefined radiation 4.

Preferably but not necessarily, said base substance 2 is a light sensitive resin suited to polymerize when stimulated by light radiation.

In particular, the light hardening resins of the known art normally used with stereolithography techniques, for example the light hardening resins described in patent documents JP2005336302 and WO2015028855, are light sensitive resins suited to be used for the present invention.

The stereolithography machine 1 comprises also an emitter unit 7 suited to selectively irradiate, with the predefined radiation 4, a layer of the base substance 2 having a predefined thickness and placed in contact with the supporting surface 3, in such a way as to obtain a solidified layer 2b.

For the sake of clarity, in the figures illustrating the invention the solidified substance is represented in black, while the non-solidified substance is represented in white.

The stereolithography machine 1 furthermore comprises an actuator device 8 suited to move the solidified layer 2b with respect to the supporting surface 3 according to a first direction Z which is perpendicular to the supporting surface 3. Preferably, said actuator device 8 comprises a supporting plate 8a with a supporting surface which faces the supporting surface 3 in order to support said solidified layer 2b.

According to the stereolithography method of the invention, the base substance 2 is applied to the supporting surface 3.

Figure 1C:
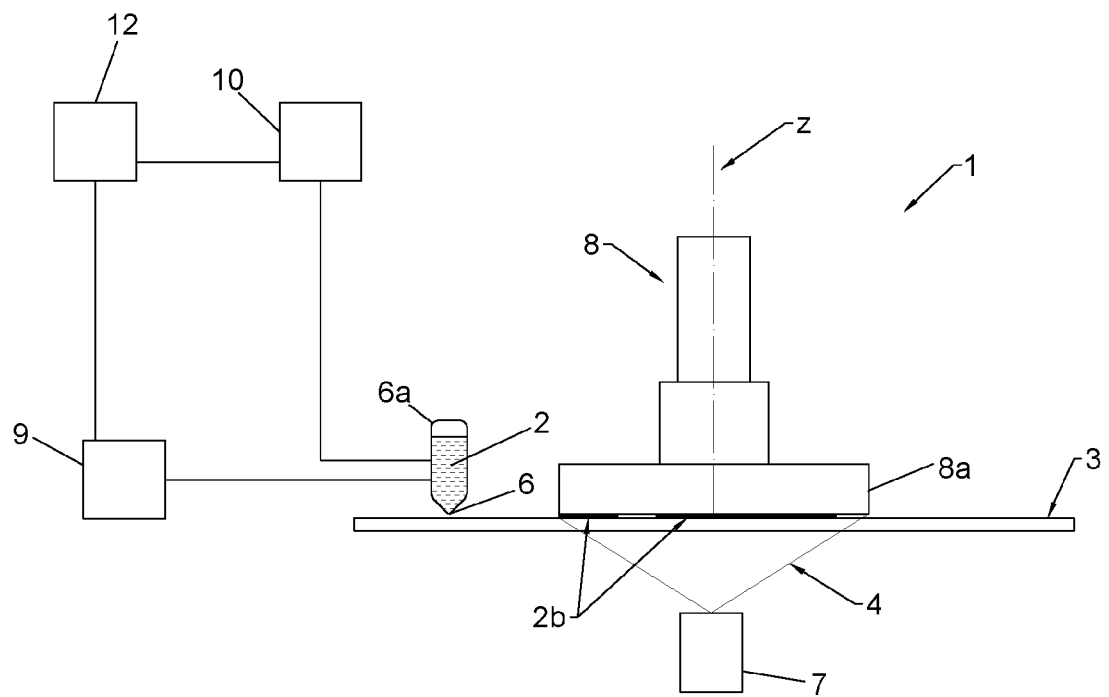

Successively, a layer of said base substance 2 having a predefined thickness and placed in contact with the supporting surface 3 is irradiated selectively, and only on the areas corresponding to the object to be obtained, with the predefined radiation 4, in such a way as to obtain a corresponding solidified layer 2b, as shown in FIG. 1c.

Preferably, the predefined radiation 4 is conveyed towards the base substance 2 through the supporting surface 3 by an emitter unit 7 facing the side of the supporting surface 3 opposite the side on which the base substance 2 is deposited. In this case, the supporting surface 3 is transparent to the predefined radiation 4.

According to a variant embodiment of the invention, not illustrated in the drawings, the emitter unit 7 faces the same side of the supporting surface 3 where the base substance 2 is deposited. In this case, the predefined radiation 4 does not pass through the supporting surface 3, which therefore does not need to be transparent to the radiation.

Figure 1D:
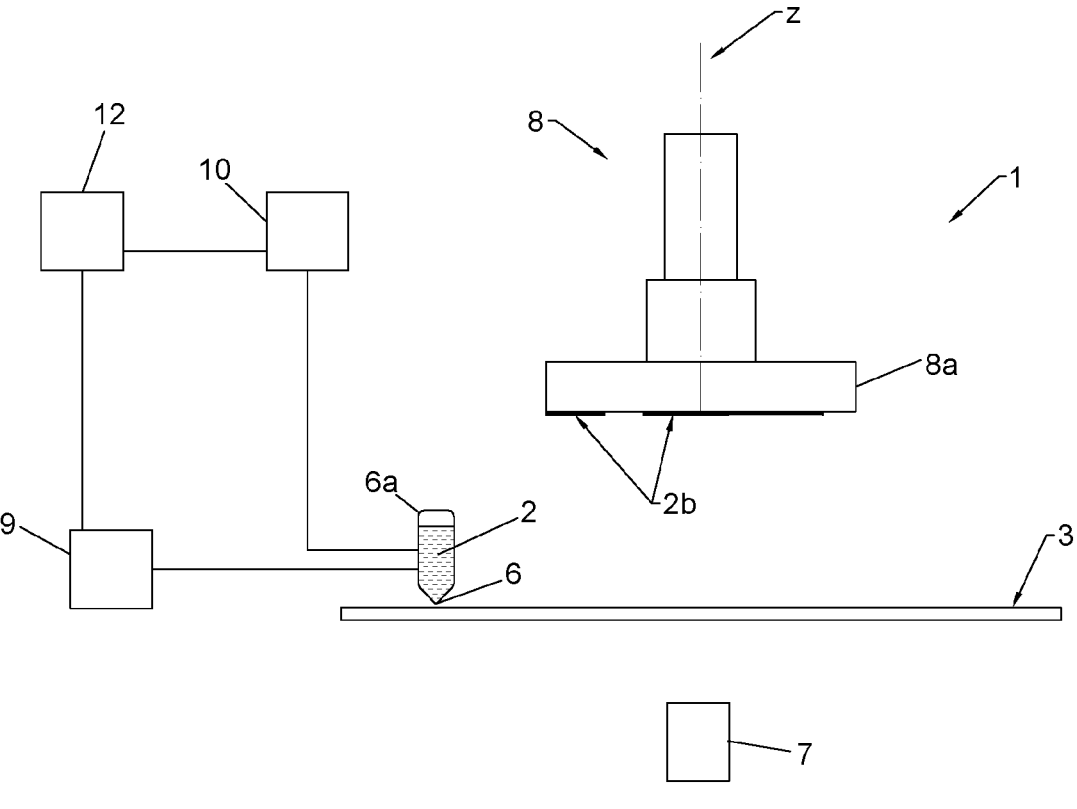

The solidified layer 2b is successively separated from the supporting surface 3 by moving them away from each other, as shown in FIG. 1d.

Preferably, after the separation of said solidified layer 2b, the base substance 2 left on the supporting surface 3 is removed.

According to the invention, said operation of applying the base substance 2 to the supporting surface 3 is carried out by depositing a single layer 2a of the base substance 2, with thickness at least corresponding to said predefined thickness, so that it comes into contact with the supporting surface 3.

Depositing a single layer 2a of base substance 2 with thickness at least corresponding to that of the layer to be solidified makes it possible to precisely control the quantity of base substance used and, therefore, to limit any waste of the latter.

The precise definition of the thickness of the layer of the base substance 2 to be solidified is obtained by adequately controlling the position of the supporting plate 8a with respect to the supporting surface 3 during the stereolithographic process. More precisely, at each solidification cycle of a layer the supporting plate 8a is moved closer to the supporting surface 3 so as to put the lower surface of the same supporting plate 8a or the lower surface of the last solidified layer at a distance from the supporting surface 3 equal to the thickness of the next layer to be solidified. In this way, between said lower surface of the supporting plate 8a, or between said lower surface of the last solidified layer and the supporting surface 3, a single layer 2a of base substance 2 having a thickness precisely equal to the layer to be solidified is defined.

The single layer 2a is deposited in a selective manner, at least on the areas corresponding to the volume of the three-dimensional object and without depositing the base substance 2 on one or more areas not belonging to the three-dimensional object to be obtained. In particular, in the case where the emitter unit 7 is a laser, according to the XY plane corresponding to said supporting surface 3, the minimum amount of base substance 2 to be deposited in excess with respect to each perimeter point of each single layer to be solidified is from 1 to 2 times the largest diameter of the ellipsoid of the intersection of the laser spot in such specific point of the plane, for each X or Y axis. This allows optimizing the saving of the same basic substance 2 and at the same time not compromising the desired definition. The term perimeter in the present context is to be understood as any internal and/or external contour of the specific layer that delimits the area of the latter.

If instead a DLP, a DMD, an LCD, or in general a dot matrix projection device is used as emitter group 7, according to the XY plan, the minimum amount of base substance 2 that has to be deposited in excess with respect to each perimeter point of each single layer to be solidified must be equal to a quantity of base substance 2 covering the linear dimension of the definition pixel of the DLP, of the DMD, of the LCD or of any other device of dot matrix projection, for each X or Y axis.

Advantageously, owing to said selective deposit it is possible to further limit the quantity of base substance 2 used for each layer, thus allowing the quantity of base substance 2 necessary to produce the object to be considerably reduced. Furthermore, considering the production of objects having the same geometrical shape, the quantity of base substance 2 to be disposed of once the object has been completed is advantageously reduced, too.

Preferably, the single layer 2a is selectively deposited only on the areas corresponding to the volume of the three-dimensional object, thus further enhancing the advantages just described above.

It cannot be excluded, however, that according to variant embodiments of the invention said single layer may be selectively deposited on larger areas than said areas corresponding to the volume of the object, provided that they include the latter.

Still preferably, the base substance 2 is selectively deposited according to a digital model of a corresponding layer of the three-dimensional object to be obtained.

Advantageously, said digital model can be made using known digital design processing and creation techniques.

Furthermore, said digital model can be created by means of a scanning device suited to scan a three-dimensional prototype of the object to be made. Preferably but not necessarily, the processing of said digital model according to known techniques may comprise the addition, to the three-dimensional model of the object, of a supporting structure ensuring increased stability of the object being formed during the operations included in the method according to the invention. Said supporting structure becomes an integral part of the three-dimensional object produced with the stereolithography machine and is separated from the rest of the object once the latter has been completed. The combination of the selective deposit of base substance 2 with selective irradiation makes it possible to obtain more precise three-dimensional objects, while at the same time using a smaller quantity of base substance 2 compared to the quantity used when the known techniques are employed, thus achieving one of the objects of the invention.

Preferably, the selective irradiation is carried out by directing a laser beam only onto the areas corresponding to the volume of the three-dimensional object to be obtained. This makes it possible to combine the advantages offered by the selective deposit of the base substance 2 with the precision of the laser beam, thus allowing extremely precise three-dimensional objects to be obtained.

It is also evident that in variant embodiments of the invention the irradiation may take place through any predefined radiation 4, provided that it is suited to selectively solidify the base substance 2 in the points corresponding to the object to be produced. The devices which allow said effects to be obtained include projector technology, for example DLP (Digital Light Processing) projectors, LCD (Liquid Crystal Screen) projectors, LCOS (Liquid Crystal on Silicium) projectors and D-ILA (Direct Drive Image Light Amplifier) projectors, as well as EBM electron beam emitters and other electromagnetic radiation sources.

Preferably, the operations of application of the base substance 2 to the supporting surface 3, selective irradiation of the layer with predefined thickness and separation of the solidified layer 2b from the supporting surface 3 are repeated for each successive layer of the three-dimensional object to be obtained.

Preferably, the selective deposit of the base substance 2 is obtained by conveying the latter through a nozzle 6 which is moved with respect to the supporting surface 3, as shown in FIG. 1b.

Preferably, said nozzle 6 is operated so as to selectively deposit the base substance 2 only on the areas corresponding to the volume of the three-dimensional object.

Figure 3A:
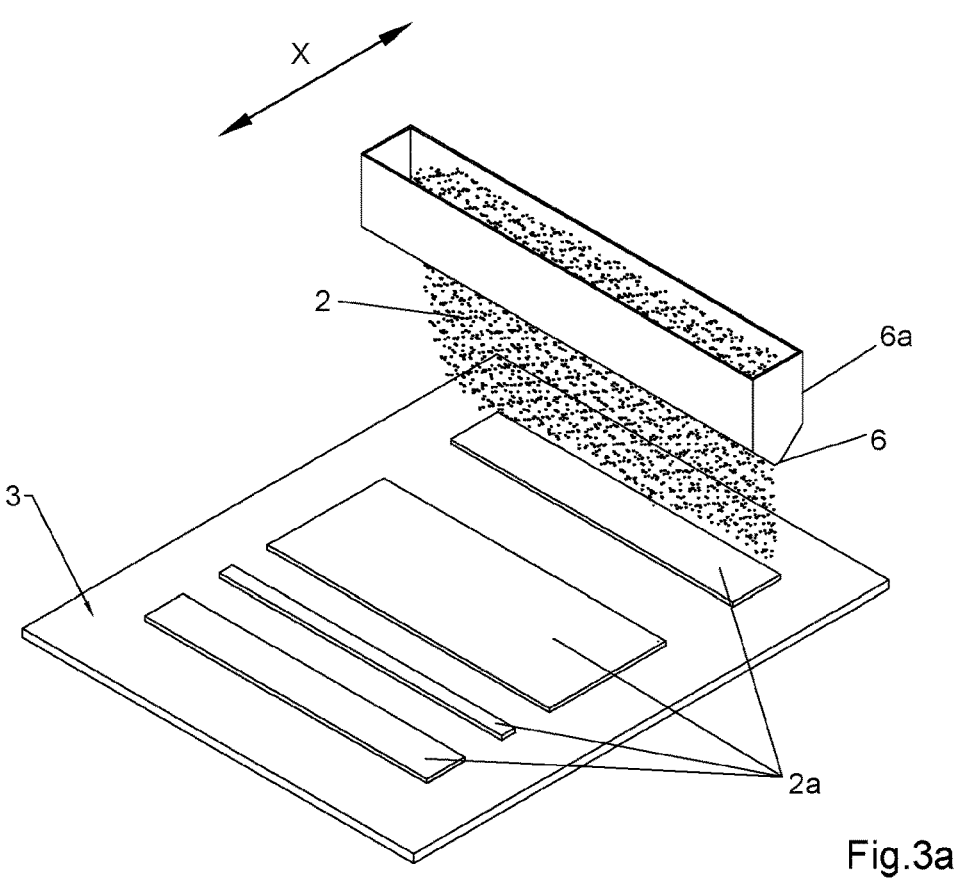
FIGS. 3a and 3b are schematic views of two respective variant embodiments of the method of the invention.
Figure 3B:
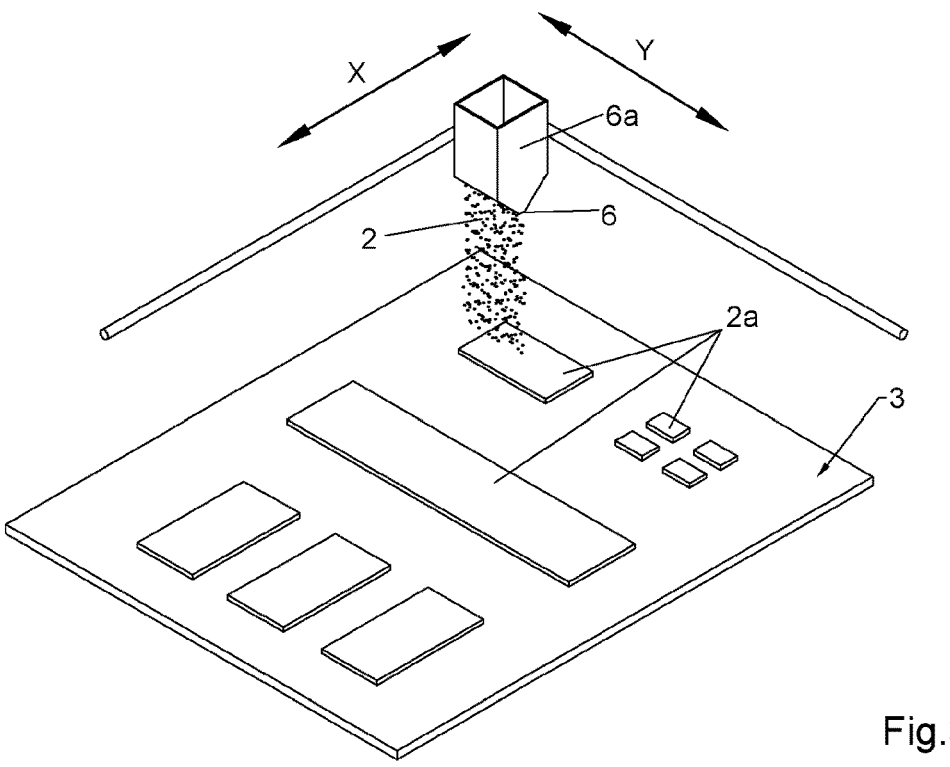

Still preferably, said nozzle 6 is moved with a Cartesian movement according to two axes X and Y which are parallel to the supporting surface 3 and orthogonal to each other, in such a way as to allow the base substance 2 to be selectively deposited point by point on the supporting surface 3, as shown in FIG. 3*b*.

According to a variant of said embodiment of the invention, the nozzle 6 is moved on the supporting surface 3 also according to a third axis which is orthogonal to the first two axes.

According to a further variant of said embodiment of the invention, the nozzle 6 is moved on the supporting surface 3 according to only one axis X, as shown in FIG. 3*a*.

In this case, the width of the nozzle 6 according to the Y-axis is at least equal to the width of the area of the supporting surface 3 which can be irradiated by the emitter unit 7.

In this way, said nozzle 6 can deposit the base substance 2 on rectangular areas whose dimension according to the Y-axis is equal to the width of said area and according to the X-axis is variable according to the needs. Furthermore, the movement of the nozzle 6 with respect to the supporting surface 3 is obtained through a moving unit 9 which is operatively connected to the nozzle 6.

Preferably but not necessarily, said moving unit 9 is configured to move the nozzle 6 with a variable and adjustable speed.

Still preferably, the flow of the base substance 2 through the nozzle 6 is regulated by a regulating unit 10.

Preferably, said regulating unit 10 makes it possible to regulate the flow of the base substance 2 through the nozzle 6 in such a way as to control and regulate the formation of the layer of base substance 2 on the supporting surface 3.

Furthermore, said moving unit 9 and said regulating unit 10 are operated in a coordinated manner by means of a control unit 12 in such a way as to selectively deposit a single layer 2*a* of base substance 2 having said predefined thickness.

The selective irradiation through the emitter unit 7 makes it possible to irradiate only the areas corresponding to the volume of the three-dimensional object to be solidified and therefore increases its resolution and accuracy compared to the results obtained with the known methods.

Therefore, the invention achieves the goal to obtain an object characterized by high resolution and accuracy, while at the same time limiting the consumption of base substance 2.

Preferably, the emitter unit 7 comprises an emitter suited to selectively direct a beam of predefined radiation 4 only towards the areas corresponding to the volume of the object to be produced, which advantageously increases the precision with which the base substance 2 is irradiated. Advantageously, said laser emitter allows the base substance 2 to be irradiated with high precision. On the other hand, it is evident that in variant embodiments of the invention the emitter unit 7 can be of any type, provided that it is suited to emit a predefined radiation 4 in a selective manner in order to solidify the base substance 2. The devices suited to be used in the manner described above include DLP (Digital Light Processing) projectors, LCD (Liquid crystal screen) projectors, LCOS (Liquid Crystal on silicon) projectors and D-ILA (Direct Drive Image Light Amplifier) projectors, as well as EBM electron beam emitters and other electromagnetic radiation sources.

Preferably, said control unit 12 acts on the regulating unit 10 in such a way as to interrupt the flow of the base substance 2 in the areas not belonging to the object, thus allowing the single layer 2*a* to be selectively deposited. Preferably, said nozzle 6 is associated with a containment chamber 6*a* which contains said base substance 2. In this way, during the depositing operation, the base substance 2 flows from said containment chamber 6*a* into the nozzle 6 in order to be deposited on the supporting surface 3, preferably with controllable flow and speed.

It cannot be excluded, however, that in different embodiments of the invention said nozzle 6 may be associated with a plurality of containment chambers 6*a* containing respective base substances different from one another and suited to be solidified through exposure to the predefined radiation 4.

Figure 2:
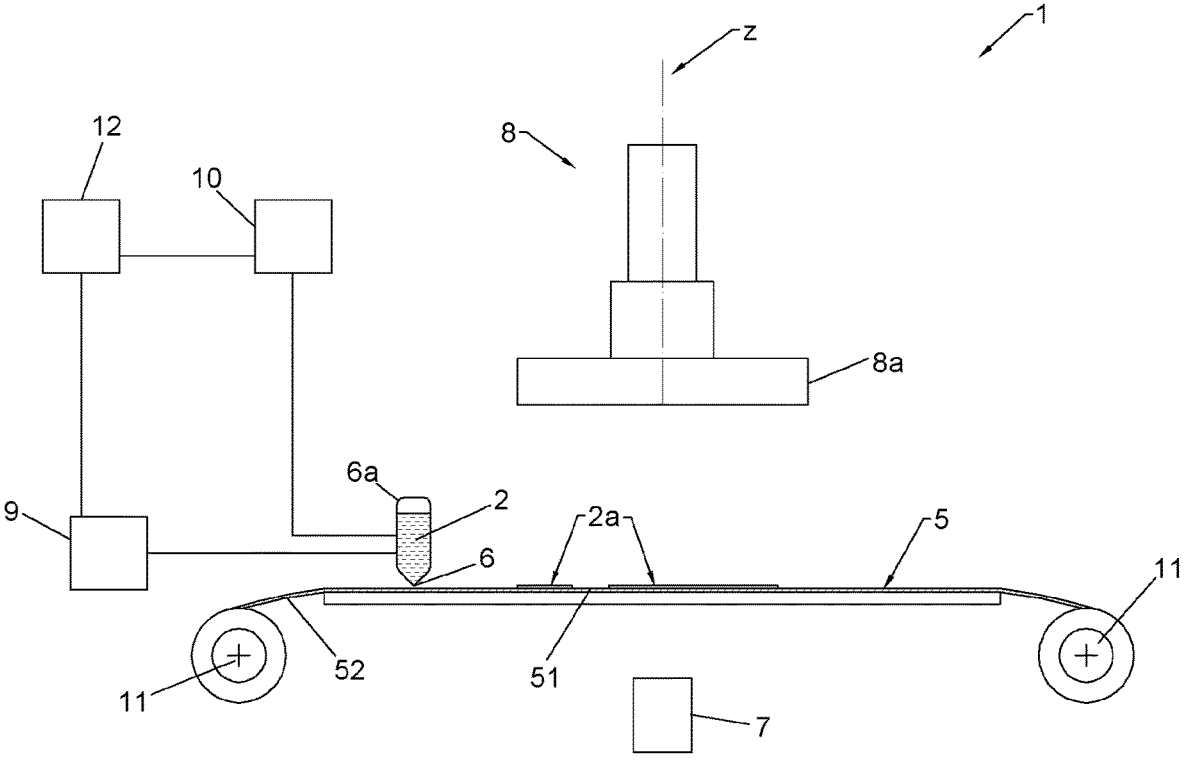
FIG. 2 shows a stereolithography machine according to a different embodiment of the invention.

According to a variant embodiment of the invention not illustrated in the figures, the stereolithography machine 1 which is the subject of the invention comprises a plurality of said nozzles 6 suited to deposit a corresponding plurality of base substances 2 selected among those described above. To advantage, the presence of said plurality of nozzles 6 makes it possible to deposit several different materials on a single layer and, therefore, to obtain an object which comprises several materials at the same time, wherein said materials have different chemical-physical characteristics and different colours. Regarding the supporting surface 3, it preferably belongs to a first laminar element 51, as shown in FIG. 2.

Preferably, the first laminar element 51 comprises a surface made of silicone or another analogous material suited to favour the separation of the solidified layer 2*b* from the supporting surface 3.

The base substance 2 is deposited on the surface of the laminar element 51 according to the method described above.

Preferably, the first laminar element 51 is replaced by a second laminar element 52 following the selective irradiation operation. This replacement operation makes it possible to remove the residues of base substance 2 left on the supporting surface 3 after the separation of the solidified layer 2*b* due to the higher precision ensured by the emitter unit 7 compared to the precision of the selective deposit obtainable with the nozzle 6, which generally involves the need to carry out the selective deposit on a larger area compared to the area which is actually going to be irradiated.

Said replacement also makes it possible to deposit each layer of base substance 2 on a new laminar element, thus avoiding the opacification of the supporting surface 3 and thus achieving a further object of the invention. Preferably but not necessarily, said second laminar element 52 substantially corresponds to the first laminar element 51 in terms of shape, size and material.

Still preferably, the first laminar element 51 and the second laminar element 52 belong to the same film 5 and said operation of replacing the first laminar element 51 with the second laminar element 52 is carried out by moving said film 5 with respect to the emitter unit 7.

Advantageously, the film 5 is made of silicone or an analogous material which facilitates the separation of the solidified layer from the supporting surface 3.

In particular, the film 5 comprises a plurality of laminar elements 51, 52 arranged in succession.

Still preferably, the film 5 is operatively associated with a feeding unit 11 suited to move the laminar elements 51, 52 with respect to the emitter unit 7, in such a way as to selectively arrange each one of the laminar elements 51, 52 so that it faces said emitter unit 7. Preferably but not necessarily, said feeding unit 11 comprises a rotary cylinder from which the film 5 is unwound.

More preferably, as shown in FIG. 2, the feeding unit 11 comprises two of said rotary cylinders, respectively arranged upstream and downstream of the supporting surface 3, which allow the film 5 to be kept tensioned.

It cannot be excluded, however, that in alternative embodiments of the invention the number of rotary cylinders may be larger than two.

Preferably, for each layer of the three-dimensional object to be obtained, the base substance 2 is deposited on the first laminar element 51 of the film 5 by proceeding as described above. Successively, the operation of selective irradiation is performed in order to obtain the solidified layer 2b, which is separated from the first laminar element 51.

Following or at the same time as said operation of separation, the feeding unit 11 moves the film 5 in order to replace the first laminar element 51 with the second laminar element 52, in such a way as to remove the excess base substance 2.

Finally, the operations of deposit, irradiation and separation are repeated on said second laminar element 52 in order to obtain a new layer of the three-dimensional object being formed.

According to a variant embodiment of the invention, not illustrated in the drawings, the layer 2a of base substance 2 is deposited on each laminar element 51, 52 before the latter is arranged so that it faces the emitter unit 7. Still preferably, said deposit is performed during the irradiation of the layer 2a arranged on the previous laminar element 51, 52. This advantageously makes it possible to reduce processing times, since it allows a depositing operation and an irradiation operation to be performed simultaneously rather than in succession.

In practice, said variant embodiment of the invention includes the following operations: selectively depositing a single layer 2a of base substance 2 on the first laminar element 51, replacing said first laminar element 51 with the second laminar element 52 in such a way as to arrange said first laminar element 51 so that it faces the emitter unit 7, selectively irradiating said single layer 2a through said emitter unit 7 in such a way as to obtain the solidified layer 2b and at the same time selectively depositing a new single layer 2a of base substance 2 on the second laminar element 52. According to said variant embodiment, once said operations have been completed the first laminar element 51 is replaced once again with the second laminar element 52, in such a way as to arrange the second laminar element 52 so that it faces the emitter unit 7. During said operation of movement, also the operation of separating the just solidified layer 2b is carried out. Once said new configuration has been obtained, the operations of selective irradiation of the second laminar element 52 and of selective deposit of base substance 2 on the first laminar element 51 are repeated simultaneously.

It should be specified that the sequence of operations described above is repeated for obtaining all the layers that make up the three-dimensional object. Also for this variant embodiment, as already indicated above, the laminar elements 51 and 52 preferably belong to the same film 5 and said operation of replacing the first laminar element 51 with the second laminar element 52 or vice versa is carried out by moving said film 5 with respect to the emitter unit 7.

According to the above, it can be understood that the stereolithography method for the production of a three-dimensional object and the sterolithography machine described above achieve all the set objects.

In particular, the selective deposit of a single layer with a predefined thickness corresponding to the thickness of the solidified layer, associated with the precision of the selective irradiation operation, makes it possible to reduce the waste of light hardening material during the production of the three-dimensional object and, consequently, the production cost of a three-dimensional object, while at the same time allowing a three-dimensional object characterized by a high level of resolution and accuracy to be produced.

Again, depositing a single layer with a predefined thickness makes it possible to reduce the traction forces generated between the solidified layer and the supporting surface while they are being separated and moved away from each other.

Furthermore, the use of a supporting surface comprising several replaceable laminar elements makes it possible to reduce the opacification of the supporting surface itself, which is due to the exposure to multiple predefined radiation.

Furthermore, the possibility to deposit several different materials on the supporting surface in order to obtain a same layer makes it possible to produce a three-dimensional object comprising layers constituted by different materials, without affecting the structural complexity of the machine and without increasing the production time of the object itself.

Finally, the implementation of the method according to the present invention allows a reduction of the processing time and production cost of a three-dimensional object, as it eliminates the need to immerse the supporting plate in the base substance, consequently quickening the operation of separating each solidified layer from the supporting surface and avoiding the waiting times required for the spontaneous formation of a new layer of base substance.

Furthermore, the processing times are quicker than the processing times involved by the systems known in the art, since with the present invention it is not necessary to wait until the irradiation of a layer of the object has been completed before depositing the light hardening material that will constitute the successive layer.

Upon implementation, the method and the machine which are the subjects of the invention may be subjected to further modifications which, although not described herein and not illustrated in the drawings, must all be considered protected by the present patent, provided that they fall within the scope of the following claims.

The invention claimed is:

1. Stereolithography method for producing a three-dimensional object through the superimposition of a plurality of layers on one another, comprising the following operations:
    a. application of a base substance (2) to a supporting surface (3) through at least a nozzle (6) which is moved along an X-axis and a Y-axis being parallel to the supporting surface (3) and orthogonal to each other through a moving unit (9), said base substance (2) being liquid or pasty and being suitable for solidification through exposure to predefined radiation (4);
    b. selective irradiation of said base substance (2) having a predefined thickness and being in contact with said supporting surface (3) through said predefined radiation (4), in such a way as to obtain a solidified layer (2b); the selective irradiation is carried out by directing the selective radiation only onto areas corresponding to a volume of said three-dimensional object to be obtained;
    c. separation of said solidified layer (2b) from said supporting surface (3) through a movement intended to move them away from each other;
    wherein
        said supporting surface (3) belongs to a first laminar element (51) and to a second laminar element (52);

said application of said base substance (2) to said supporting surface (3) is carried out by depositing a single layer (2a) of said base substance (2) so that it comes into contact with said second laminar element (52) while the second laminar element (52) is temporarily stationary, wherein said single layer (2a) has a thickness at least corresponding to said predefined thickness, said depositing being carried out by said nozzle (6) selectively only on the areas corresponding to the volume of said three-dimensional object and without depositing said base substance (2) on one or more areas not belonging to the three-dimensional object to be obtained;

said selective irradiation is carried out on said first laminar element (51) only onto the areas corresponding to the volume of said three-dimensional object to be obtained and at the same time as said application of said base substance (2) to said second laminar element (52), the application of said base substance (2) to said first laminar element (51) having been performed before said application of said base substance (2) to said second laminar element (52).

2. The method according to claim 1, further comprising a replacement operation intended to selectively arrange each one of said first laminar element (51) or said second laminar element (52) to face an emitter unit (7) configured to emit said predefined radiation (4), said replacement operation being carried out after said selective irradiation.

3. The method according to claim 1, wherein said first laminar element (51) and said second laminar element (52) belong to a same film (5).

4. The method according to claim 2, wherein said replacement operation is carried out by moving said film (5).

5. The method according to claim 2, wherein said replacement operation takes place at the same time as said separation of said solidified layer (2b) from said supporting surface (3).

6. The method according to claim 1, wherein said selective irradiation of said base substance (2) is carried out by directing a laser beam only onto the areas corresponding to the volume of said three-dimensional object.

7. The method according to claim 2, further comprising removing, from said supporting surface (3), the base substance (2) that remained thereon after said separation of said solidified layer (2b) from said supporting surface (3).

8. The method according to claim 7, wherein said removing of the base substance is carried out through said replacement operation.

9. The method according to claim 1, wherein said depositing of said layer (2a) of base substance (2) having a predefined thickness is performed according to a digital model of a corresponding layer of said three-dimensional object.

10. The method according to claim 1, further comprising said application of said base substance (2) to said supporting surface (3), of said selective irradiation of said layer (2a) having a predefined thickness, and of said separation of said solidified layer (2b) for each successive layer of said three-dimensional object.

11. The method according to claim 1, wherein said application of said base substance (2) to said support surface (3) by depositing a single layer (2a) of said base substance (2) provides for, in the event that said selective irradiation operation is carried out by directing a laser beam, depositing in excess with respect to each perimeter point of said single layer (2a) an amount of said base substance (2) from 1 to 2 times the largest diameter of the ellipsoid of the intersection of the spot of said laser beam at said perimeter point on said support surface (3), for each X or Y axis.

12. Stereolithography method for producing a three-dimensional object through the superimposition of a plurality of layers on one another, comprising the following operations:

a. application of a base substance (2) to a supporting surface (3) through at least a nozzle (6) which is moved along an X-axis and a Y-axis being parallel to the supporting surface (3) and orthogonal to each other, the nozzle (6) is moved with a Cartesian movement with respect to the supporting surface (3) according to two axes X and Y which are parallel to the supporting surface (3) and orthogonal to each other, said base substance (2) being liquid or pasty and being suitable for solidification through exposure to predefined radiation (4) produced by means of an emitting unit that is a laser or a DLP, a DMD, an LCD, or in general a dot matrix projection device;

b. selective irradiation of said base substance (2) having a predefined thickness and being in contact with said supporting surface (3) through said predefined radiation (4), in such a way as to obtain a solidified layer (2b); the selective irradiation is carried out by directing the selective radiation only onto areas corresponding to a volume of said three-dimensional object to be obtained;

c. separation of said solidified layer (2b) from said supporting surface (3) through a movement intended to move them away from each other;

wherein:

said supporting surface (3) belongs to a first laminar element (51) and to a second laminar element (52);

said application of said base substance (2) to said supporting surface (3) is carried out by depositing a single layer (2a) of said base substance (2) so that it comes into contact with said second laminar element (52) while the second laminar element (52) is temporarily stationary, wherein said single layer (2a) has a thickness at least corresponding to said predefined thickness, said depositing being carried out selectively only on the areas corresponding to the volume of said three-dimensional object and without depositing said base substance (2) on one or more areas not belonging to the three-dimensional object to be obtained said selective irradiation is carried out on said first laminar element (51) only onto the areas corresponding to the volume of said three-dimensional object to be obtained and at the same time as said application of operation of applying said base substance (2) to said second laminar element (52), the application of said base substance (2) to said first laminar element (51) having been performed before said application of said base substance (2) to said second laminar element (52); and the minimum amount of base substance (2) to be deposited in excess with respect to each perimeter point of each single layer to be solidified is from 1 to 2 times the largest diameter of the ellipsoid of the intersection of the laser spot in such specific point of the plane, for each X or Y axis; if a DMD, an LCD, or in general a dot matrix projection device is used, according to the XY plan, the minimum amount of base substance (2) that has to be deposited in excess with respect to each perimeter point of each single layer to be solidified must be equal to a quantity of base substance (2) covering the linear dimension of the definition pixel of the DLP, of the DMD, of the LCD or of any other device of dot matrix projection, for each X or Y axis.

13. Stereolithography method for producing a three-dimensional object through the superimposition of a plurality of layers on one another, comprising the following operations:

a. application of a base substance (2) to a supporting surface (3) through at least a nozzle (6) which is moved with respect to the supporting surface (3), said base substance (2) being liquid or pasty and being suitable for solidification through exposure to predefined radiation (4);

b. selective irradiation of said base substance (2) having a predefined thickness and being in contact with said supporting surface (3) through said predefined radiation (4), in such a way as to obtain a solidified layer (2b); the selective irradiation is carried out by directing the selective radiation only onto areas corresponding to a volume of said three-dimensional object to be obtained;

c. separation of said solidified layer (2b) from said supporting surface (3) through a movement intended to move them away from each other;

wherein:

said supporting surface (3) belongs to a first laminar element (51) and to a second laminar element (52);

said application of said base substance (2) to said supporting surface (3) is carried out by depositing a single layer (2a) of said base substance (2) so that it comes into contact with said second laminar element (52) while the second laminar element (52) is temporarily stationary, wherein said single layer (2a) has a thickness at least corresponding to said predefined thickness, said depositing being carried out selectively only on the areas corresponding to the volume of said three-dimensional object and without depositing said base substance (2) on one or more areas not belonging to the three-dimensional object to be obtained said selective irradiation is carried out on said first laminar element (51) only onto the areas corresponding to the volume of said three-dimensional object to be obtained and at the same time as said application of operation of applying said base substance (2) to said second laminar element (52), the application of said base substance (2) to said first laminar element (51) having been performed before said application of said base substance (2) to said second laminar element (52); and the nozzle (6) is moved on the supporting surface (3) according to only one axis X and width of the nozzle (6) according to an Y-axis is at least equal to the width of the area of the supporting surface (3) which can be irradiated.

* * * * *